United States Patent [19]

Sager, Jr.

[11] 3,844,899

[45] Oct. 29, 1974

[54] MULTISTAGE FLASH DISTILLATION

[75] Inventor: Paul H. Sager, Jr., Solana Beach, Calif.

[73] Assignee: General Atomic Company, San Diego, Calif.

[22] Filed: Sept. 25, 1972

[21] Appl. No.: 291,980

[52] U.S. Cl.............. 202/173, 203/11, 159/2 MS
[51] Int. Cl........ B01d 3/00, B01d 1/28, B01d 3/10, B01d 3/02
[58] Field of Search..... 159/2 MS; 202/173; 203/10, 203/11

[56] References Cited
UNITED STATES PATENTS

| | | | |
|---|---|---|---|
| 3,119,752 | 1/1964 | Checkovich | 202/173 X |
| 3,344,404 | 9/1967 | Wulfson | 202/173 X |
| 3,489,652 | 1/1970 | Williamson | 202/173 X |
| 3,501,384 | 3/1970 | Starmel | 203/11 |
| 3,580,818 | 5/1971 | Villiers et al. | 159/2 MS X |
| 3,734,835 | 5/1973 | Spicacci | 159/2 MS X |

*Primary Examiner*—Jack Sofer
*Attorney, Agent, or Firm*—Fitch, Even, Tabin & Luedeka

[57] ABSTRACT

A plurality of trains of multistage flash distillation units for sea water or the like. A first incoming brine stream is heated and injected into the flash evaporation section of the highest pressure stage of the longest train. A second brine stream is heated by passage through the condenser sections of the longest train, withdrawn from the highest pressure stage, and injected into the evaporation section of the highest pressure stage of the next longest train. The heated condenser streams from each train are likewise injected into the next shorter train.

8 Claims, 1 Drawing Figure

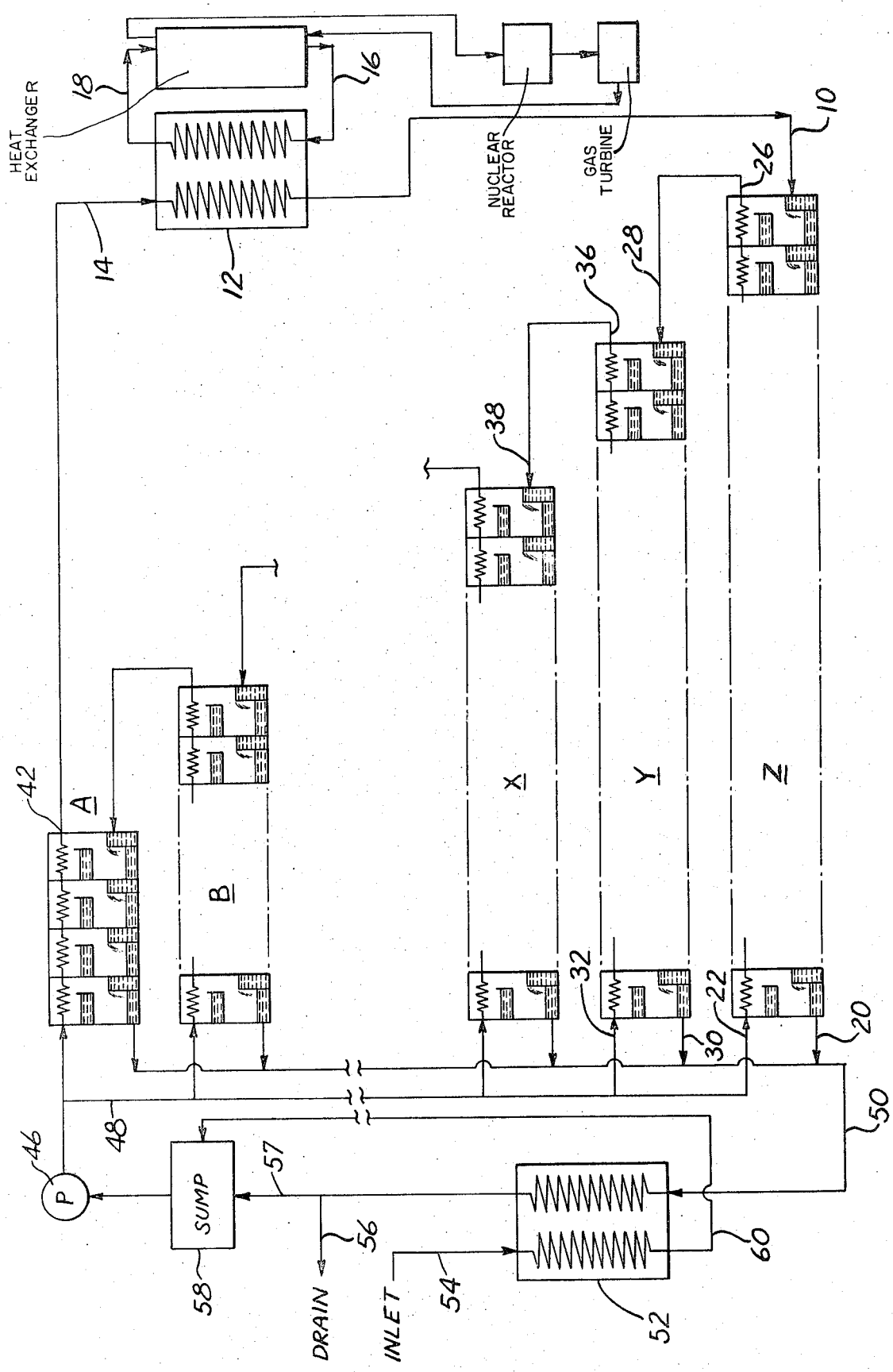

MULTISTAGE FLASH DISTILLATION

The present invention is related to flash distillation and more particularly is directed to multi-stage flash distillation particularly suited for the desalinization of sea water or the like.

Flash distillation is often employed in the recovery of a solvent from a solution containing a salt or other dissolved material, for example, desalinization of sea water to produce fresh water. Flash distillation is also employed in the chemical industry and in the food industry for the concentration of liquors. In such operations, the solution being treated is commonly referred to as the "brine," and that terminology is used hereinafter in this specification; however its use should not be considered to indicate any restriction to treatment of a saline solution. Multistage flash distillation heats the brine to a desired temperature in its liquid state and then effects the evaporation of the heated solution in a series of stages which are maintained at progressively decreasing pressures. The condensation of the vapor created at each stage is carried out to produce the substantially pure solvent which is withdrawn. The heat which is absorbed during the condensation is often employed for the preheating of the brine prior to its expansion.

It is generally known to employ parallel trains of multistage flash evaporation units, particularly in the desalinization of sea water. Such installations are able to carry out desalinization in a manner which is economically competitive with other available alternative methods of desalinization. One example of such a parallel train, multistage, flash evaporation unit is shown in U.S. Pat. No. 3,580,818, issued May 25, 1971.

It is the object of the present invention to provide improved capacity in multistage flash distillation. Another object is to provide greater product capacity from distillation or concentration methods utilizing parallel train, multistage flash distillation coupled to a source of heat of particular conditions. A further object is to provide a parallel train, multistage flash distillation system particularly adapted for the desalinization of sea water or the like utilizing a high temperature, single phase fluid as a source of heat.

These and other objects of the invention will be apparent from the following detailed description when read in conjunction with the accompanying drawing diagrammatically illustrating a parallel train, multistage flash evaporation unit.

Briefly, the invention provides a parallel train, multistage flash evaporation unit, which requires only a single brine heater to provide the heat necessary for the operation for all of the stages for all of the parallel trains. Operation of the system in the described manner results in increased capacity of product output from heat input of particular conditions.

Illustrated in the drawing are five parallel trains of a multistage flash distillation unit. Depicted are the shortest train A, the next shortest train B, and the three longest trains X, Y and Z. It should be understood that although five parallel trains are depicted it is anticipated that any reasonable number of trains may be employed. For example, an installation might utilize fifteen or more such parallel trains of multistage flash evaporation units. Likewise, the shortest train A is depicted as having four stages, and this again is simply a matter of choice because each train may have any reasonable number of stages, nearly always different than the adjacent train. It is considered that each train may have about three to five additional stages, compared to the next shorter train.

The operation is hereinafter explained by generally making reference to the desalinization of sea water, but it should be understood that the invention may be employed for the recovery for other solvents from solutions and/or for the concentration of various liquors. As depicted in the drawing, each flash distillation stage includes an evaporation chamber or section into which the heated solution being treated is fed and caused to partially flash to vapor. A condenser section is located in the upper portion of each stage, and a distillate takeoff system is disposed vertically below the condenser tubing to catch the condensed water which falls thereinto via gravity.

In each illustrated train, the heated brine flows from right to left successively through the evaporation chambers of each stage in the train. At the same time, cooler brine is passed through the interconnected piping in the condenser sections flowing from left to right, in countercurrent flow to the direction of the heated brine. The distillate may be withdrawn from each stage or may be manifolded in any suitable manner, as the distillate takeoff arrangement forms no part of the present invention.

More specifically, brine at a desired temperature is injected through the line 10 into the righthand end stage of the longest multistage flash distillation train Z. The brine is heated to this desired temperature, which is the maximum temperature at which any of the stages of the parallel trains operate, by passage through a brine heater 12. The brine is pumped into the brine heater 12 through inlet line 14 and exits therefrom into the feed line 10. Only a single brine heater 12 having a single brine inlet 14 and a single brine outlet 10 is needed to provide the heat for the operation of the entire parallel train, multi-stage flash distillation unit. One of the advantages of the invention lies in the utilization of only a single brine heater, whereas it has previously been common that a plurality of brine heaters be used, one for each train, or at least that the brine be passed through a common heater prior to injection into the first expansion chamber of each train.

The brine heater 12 may utilize any suitable source of heat; however, the system is eminently well suited to utilize the waste heat from a nuclear reactor power generating station, which would be available in the form of hot water or other single phase fluid at a temperature in the neighborhood of 300°F. to 400°F. Accordingly, it is shown as having a hot fluid inlet 16 and an outlet 18. To aid in the description, the system is described with respect to an exemplary system wherein the brine exits from the brine heater 12 at a temperature of about 250°F. and is injected into the first righthand stage of the longest train Z at a pressure of about 29 p.s.i.a. The longest train may, for example, have about 40 stages with each stage being operated at about three-fourths of a p.s.i. lower pressure than the next adjacent stage.

The hot incoming brine partially flashes to water vapor at the pressure that is maintained in this stage, and the brine is then conducted to the next adjacent lower pressure stage where such a partial flashing again occurs. This operation is repeated in each of the stages of the train Z until it eventually reaches the discharge pipe 20 at the end of the last stage.

Brine from an inlet pipe 22 is pumped into the condenser tubing in the lowest pressure stage of the longest train Z, and it flows in succession through the interconnected tubing of each of the higher pressure stages until it reaches the first stage at the righthand end thereof. The temperature of this brine is raised in each stage as it takes up heat from the condensing water vapor which it cools to provide the product distillate. By the time the brine reaches the righthand end stage, its temperature has reached about 235°F.

In the usual multistage flash evaporation unit, this heated brine would then be withdrawn, raised to a higher temperature and then returned to flash into the high pressure stage from which it was withdrawn. However, in accordance with the present invention, the heated brine from the condenser section of the highest pressure stage of the longest train Z is withdrawn through the conduit 26 and conducted directly to the inlet pipe 28 leading to the expansion section of the highest pressure stage of the next longest train Y where it is partially flashed to vapor. The brine is then conducted successively to each of the stages in the train Y until it exits from the lowest pressure stage through the discharge line 30. Similarly, low temperature brine is pumped into the inlet pipe 32 leading to the condenser section of the lowest pressure stage of the train Y, and this brine flows successively through the condenser sections of each stage in the train Y until it is withdrawn from the highest pressure stage through the pipe 36. The heated brine leaving the highest pressure stage through that pipe 36 is at a temperature of about 220°F. This brine is conducted directly to inlet 38, and upon injection into the highest pressure stage of the next longest train X, it is partially flashed to vapor.

Thus, the heated brine exiting from the interconnected condenser sections, at the highest pressure stage of the trains, is injected into the evaporation section of the highest pressure stage of the next longest train. This arrangement is repeated throughout all of the trains down to the shortest train A. The brine which is preheated in the interconnected condenser sections of the shortest train A is withdrawn through the pipe 42 and conducted to the inlet 14 to the brine heater 12 where its temperature is raised to the desired temperature for injection into the first stage of the longest train Z.

The inlet pipes for supplying the low temperature brine from a pump 46 to the lowest pressure condenser sections of each train are preferably manifolded into a common line 48; however, a plurality of pumps may be used. Likewise, all or any number of the discharge lines 20,30 carrying the hot concentrated brine from the lowest pressure stage of each train may also be manifolded into a common line 50. Depending upon the overall design of the system, this hot concentrated brine from the line 50 will generally be fed into a heat-rejection section 52 where it gives up some of its remaining heat to incoming sea water being pumped through line 54. Part of concentrated brine may be discharged through a line 56 to the source of the sea water, and the remainder is directed through the line 57 into a sump 58 where it is diluted with makeup preheated sea water from the line 60. The pump 46 takes its suction from the sump 58.

The illustrated system is considered to be particularly valuable for use in connection with a nuclear reactor-gas turbine, power-generating plant, particularly one using a high temperature, gas-cooled nuclear reactor or with other single-phase heat rejection systems, such as one serving the exhaust of an open cycle gas turbine system. In such a nuclear reactor installation, there are advantages to using water under pressure to finally cool the gas before its return to the reactor, thus producing a single-phase fluid, i.e., hot water, at a temperature of, for example, about 340°F. that requires cooling. This 340°F. fluid provides an excellent heat source for the brine heater 12; and likewise, the cooling of this fluid can be effectively accomplished in combination with the illustrated system, because there will be an adequate temperature differential to efficiently accomplish both purposes, i.e., the heating of the brine and the cooling of the fluid.

For example, the preheated brine exiting from the condenser section of the shortest train may be at a temperature of about 120°F. which, compared to the 340°F. fluid to be cooled, provides a temperature differential of about 220°F. Accordingly, the brine heater 12 can be efficiently employed to heat a rather large volume of brine because the temperature desired for the brine feed stream to the train Z, i.e., about 250°F., provides a very large temperature differential on the upper end, viz. 340°F.−250°F. = 90°F. Likewise, the system efficiently cools the fluid from the nuclear reactor turbine, which requires the cooling, and can be used to drop its temperature to about 135°F. Accordingly, the combined systems provide an efficient and economical marriage which has substantial advantages. The same advantages generally hold true for any single-phase source of heat, particularly waste heat, where there is only sensible heat available, as opposed to latent heat. Likewise, the overall system design which requires the construction of only a single brine heater provides economies in the initial equipment expenditure for the desalinization portion of the system which is a further significant advantage.

Although the invention has been described primarily with regard to a single illustrated system operating to accomplish desalinization, modifications and changes as would be obvious to one having the ordinary skill in the art are contemplated as falling within the spirit and scope of the invention which is defined in the claims appended hereto. Various of the features of the invention are set forth in the following claims.

What is claimed is:

1. A flash distillation method for the treatment of sea water or the like, which process comprises providing a plurality of parallel flow trains of multistage flash distillation units of successively greater numbers of units with respect to increasing temperature gradient, the stages of each train having interconnected condenser sections and interconnected flash evaporation sections respectively, maintaining said evaporation sections of each train at progressively lower pressures, preheating a first dilute incoming brine stream in the interconnected condenser sections of the shortest train and then heating said brine stream to a desired temperature and injecting said preheated and heated first stream into the highest pressure flash evaporation section of the longest train of the multistage unit, said desired temperature of said preheated and heated stream causing flashing to occur upon injection, heating a second equally dilute brine stream by heat-exchange with condensing vapor by passing said second stream through the interconnected condenser sections of the longest train in the direction of increasing pressure gradient, withdrawing said heated second stream from the condenser section of said highest pressure stage, and injecting said heated second stream into the highest pressure flash evaporation section of the next longest train, said heated second stream being at a temperature where flashing occurs upon injection.

2. A method in accordance with claim 1 wherein a third equally dilute brine stream is heated by being passed through the interconnected condenser sections of said next longest train, and said third stream is withdrawn from the highest pressure stage thereof and then injected into the flash distillation section of the highest pressure stage of the next still shorter train.

3. A method in accordance with claim 1 wherein said desired temperature is at least about 250°F.

4. A method in accordance with claim 1 wherein said heating of said first stream to said desired temperature is accomplished by heat-exchange with a single-phase fluid.

5. A flash distillation system for the treatment of sea water or the like, which system comprises a plurality of parallel flow trains of multistage flash distillation units of seccessively greater numbers of units with respect to increasing temperature gradient, the stages of each train having interconnected condenser sections and interconnected flash evaporation sections maintained at progressively lower pressures, means for preheating a first dilute incoming brine stream by passage thru the interconnected condenser sections of the shortest train, heating means for heating said first preheated brine stream to a desired temperature, means for conducting said preheated and heated first stream to the flash evaporation section of the highest pressure stage of the longest multistage train and injecting said first stream thereinto where said desired temperature causes said heated stream to partially flash to vapor upon injection, means for passing a second equally dilute stream of brine through said interconnected condenser sections of said longest train in the direction of increasing pressure gradient to heat said second stream by heat-exchange with condensing vapor, and means for withdrawing said heated second stream from the condenser section of said highest pressure stage of said longest train and for injecting said heated second stream into the flash evaporation section of the highest pressure stage of the next longest train, said heated second stream being at a temperature where flashing occurs upon injection.

6. A system in accordance with claim 5 wherein means is provided for feeding a third equally dilute stream of brine into interconnected condenser sections of said next longest train to thereby heat said third stream and wherein means is provided for withdrawing said third stream from the highest pressure stage of said next longest train and injecting said heated third stream into the flash distillation section of the highest pressure stage of the next still shorter train.

7. A system in accordance with claim 5 wherein means is provided for collecting concentrated brine discharges from at least some of said parallel trains, for passing said collected discharges in heat-exchange with make-up sea water to initially preheat the makeup sea water and for recirculating at least a portion of said collected discharge together with the initially preheated make-up sea water to constitute said first dilute stream.

8. A system in accordance with claim 5 wherein a gas-cooled nuclear reactor-gas turbine power-generating plant is provided having means for employing water under pressure to cool the gas coolant and wherein means is provided for feeding said heated water under pressure to said first heating means.

* * * * *